(12) United States Patent
Garcia-Sanchez (10) Patent No.: US 11,196,851 B2
(45) Date of Patent: Dec. 7, 2021

(54) HEADWEAR FOR USE WITH PERSONAL COMMUNICATION DEVICES INCLUDING A CAMERA

(71) Applicant: Daniel Garcia-Sanchez, Wexford, PA (US)

(72) Inventor: Daniel Garcia-Sanchez, Wexford, PA (US)

(*) Notice: Subject to any disclaimer, the term of this patent is extended or adjusted under 35 U.S.C. 154(b) by 0 days.

(21) Appl. No.: 16/849,628

(22) Filed: Apr. 15, 2020

(65) Prior Publication Data

US 2020/0336582 A1 Oct. 22, 2020

Related U.S. Application Data

(60) Provisional application No. 62/834,802, filed on Apr. 16, 2019.

(51) Int. Cl.
| | | |
|---|---|---|
| *H04M 1/05* | (2006.01) | |
| *H04B 1/3877* | (2015.01) | |
| *A42B 1/245* | (2021.01) | |
| *H04B 1/3827* | (2015.01) | |

(52) U.S. Cl.
CPC ............ *H04M 1/05* (2013.01); *A42B 1/245* (2013.01); *H04B 1/385* (2013.01); *H04B 1/3877* (2013.01); *H04B 2001/3866* (2013.01)

(58) Field of Classification Search
CPC .......... H04M 1/05; A42B 1/245; H04B 1/385; H04B 1/3877; H04B 2001/3866
See application file for complete search history.

(56) References Cited

U.S. PATENT DOCUMENTS

| | | | |
|---|---|---|---|
| 4,953,766 | A | 9/1990 | Cruickshank |
| 7,044,615 | B2 | 5/2006 | Gesten |
| 7,885,692 | B2 | 2/2011 | Cascone |
| 8,009,847 | B2 | 8/2011 | Planansky |
| 8,040,292 | B2 | 10/2011 | Ronzani |
| 8,342,758 | B2 | 1/2013 | Braithwaite |
| 9,280,935 | B2 | 3/2016 | Yuen |
| 9,389,677 | B2 | 7/2016 | Hobby |
| 9,609,902 | B2 | 4/2017 | Waters |
| 9,872,530 | B2 | 1/2018 | Waters |
| 10,362,813 | B2 | 7/2019 | Cobbett |

(Continued)

FOREIGN PATENT DOCUMENTS

| | | |
|---|---|---|
| CN | 202999444 U | 6/2013 |
| CN | 206042094 U | 3/2017 |
| CN | 208369676 U | 1/2019 |

OTHER PUBLICATIONS

Hat Compatible with Removable GoPro Camera Head Mount; FreeCapture; Amazon.com; Sep. 17, 2019.

(Continued)

*Primary Examiner* — Nguyen T Vo
(74) *Attorney, Agent, or Firm* — Bartony & Associates, LLC (57) ABSTRACT

An article of headgear to be worn on the head of a user includes a first portion to encompass at least a portion of the head of the user and a visor extending forward from the first portion. The visor includes a laterally extending opening therein to receive a personal communication device including a camera such that a lens of the camera is positioned below the lower surface of the visor.

18 Claims, 12 Drawing Sheets

(56) References Cited

U.S. PATENT DOCUMENTS

| | | | | |
|---|---|---|---|---|
| 2002/0186180 | A1* | 12/2002 | Duda | H04L 67/04 |
| | | | | 345/8 |
| 2004/0128737 | A1* | 7/2004 | Gesten | A42B 1/245 |
| | | | | 2/171 |
| 2006/0037125 | A1* | 2/2006 | McDowell | G02B 7/002 |
| | | | | 2/209.13 |
| 2010/0313334 | A1 | 12/2010 | Moy | |
| 2014/0047617 | A1* | 2/2014 | Abers | A42B 1/245 |
| | | | | 2/209.13 |
| 2014/0304891 | A1* | 10/2014 | Waters | A42B 1/244 |
| | | | | 2/209.13 |
| 2015/0063777 | A1* | 3/2015 | Letke | H04N 1/2112 |
| | | | | 386/224 |
| 2015/0358515 | A1 | 12/2015 | Resnick | |
| 2017/0139212 | A1* | 5/2017 | Choi | H04N 13/344 |
| 2018/0011333 | A1* | 1/2018 | Ansay | G02B 30/37 |
| 2018/0017796 | A1* | 1/2018 | Toso | G02B 27/0176 |

OTHER PUBLICATIONS

Fishing Camera Hat Camera Cap Mini Camera Recording by Shaking Time-lapse Video Wifi Auto Zoom; DYFZ; Amazon.com; Sep. 17, 2019.

Streamaroo Universal Hands-Free Smartphone Hat Mount; Streamaroo; Amazon.com; Sep. 17, 2019.

* cited by examiner

The camera capture a point-of-vew video of, for example, what is happening within close reach of the user.

Fig. 5

Fig. 4 for example,
a 3.5 x 0.5 (inches)
opening/slot

A strap on each side of the cut is sewed to the top of the visor, while leaving enough material for a loop to drop and hang through the cut Cut in visor

Gaze

Strap

Loop

Fig. 9

When the phone goes through the cut, the loop "cradles" the phone while keeping the front camera unobstructed

Phone

Front Camera

Camera Not Obstructed

Fig. 10

HEADWEAR FOR USE WITH PERSONAL COMMUNICATION DEVICES INCLUDING A CAMERA

CROSS-REFERENCE TO RELATED APPLICATIONS

This application claims benefit of U.S. Provisional Patent Application Ser. No. 62/834,802, filed Apr. 16, 2019, the disclosure of which is incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Many times, in the home and in various businesses it is desirable to transmit video (and preferably audio as well) of a task being completed by a person to a remote location. For example, a remote spouse may wish to provide assistance to the other spouse in a home on how to accomplish a certain task. In providing such directions, it may be very beneficial to have real time video of the point of view of the spouse in the home. Also, a remote worker may wish to provide assistance to an onsite worker in accomplishing a task. Once again, it may be very beneficial to have real time video of the point of view (POV) of the onsite worker. A remote person may, for example, provide audio instructions to an onsite person based on real time POV video. Although personal communication devices such as smartphones are provided with high quality video cameras and many apps which enable two-way video and audio communication, it is difficult for the at-home or onsite person to hold a camera in such a way as to provide an adequate view to a remote person while simultaneously trying to complete a task.

A number of devices and methodologies have been used to add audio and/or visual equipment, including personal communication devices such as smartphones, to articles worn by a user. For example, such audio and/or visual equipment has been attached to an upper surface or a lower surface of a brim or visor portion of headgear. However, problems with such devices and methodologies include a difficulty in aligning a camera of the attached equipment with a direction of gaze of the user and/or in maintaining such alignment. The weight of modern smartphones and other personal communication devices may, for example, create difficulty in maintaining the position of the headgear relative to the user (and thus create difficulty of maintaining the direction of alignment of the camera relative to the user), when attached to an upper or lower surface of headgear, particularly upon movement of the user's head.

SUMMARY

In one aspect, an article of headgear to be worn on the head of a user includes a first portion to encompass at least a portion of the head of the user and a visor extending forward from the first portion. The visor includes a laterally extending opening therein to receive a personal communication device including a camera such that a lens of the camera is positioned below the lower surface of the visor. In that regard, the laterally extending opening is dimensioned so that the personal communication device may be inserted therein and slid therethrough.

The article of headgear may further include a support system attached to the visor to support the personal communication device. The support system may, for example include one or more a plurality of spaced looped straps to extend around a lower end of the personal communication device.

In a number of embodiments, the article of headgear further includes at least one angled abutment member attached to the visor in the vicinity of the laterally extending opening to assist in maintaining the personal communication device in a predetermined range of angles relative to the visor. The article of headgear may, for example, include a first angled abutment member attached to the visor in the vicinity of a front edge of the laterally extending opening and a second angled abutment member attached to the visor in the vicinity of a rear edge of the laterally extending opening to assist in maintaining the personal communication device in a predetermined range of angles relative to the visor.

In a number of embodiments, a lower edge of the personal communication device is placed in close vicinity to (for example, within 10 mm, within 5 mm or within 2 mm) or contacts the forehead of the user when inserted through the laterally extending opening. An angle of a plane defined by the lens of the camera of the personal communication device may, for example, be maintained in a predetermined range of angles. When inserted through the laterally extending opening, a first portion of the personal communication device may extend below the visor, while a second portion of the personal communication device extends above the visor.

In another aspect, a system includes an article of headgear to be worn on the head of a user including a first portion to encompass at least a portion of the head of the user and a visor extending forward from the first portion, the visor comprising a laterally extending opening, and a personal communication device including a camera. The laterally extending opening is dimensioned to pass the personal communication device therethrough such that a lens of the camera is positioned below the lower surface of the visor.

A support system may be attached to the visor to support the personal communication device. In a number of embodiments, the support system includes one or more spaced looped straps to extend around a lower end of the personal communication device.

The system (or the article of headgear thereof) may further include at least one angled abutment member attached to the visor in the vicinity of the laterally extending opening to assist in maintaining the personal communication device in a predetermined range of angles relative to the visor. In a number of embodiments, a first angled abutment member is attached to the visor in the vicinity of a front edge of the laterally extending opening and a second angled abutment member is attached to the visor in the vicinity of a rear edge of the laterally extending opening to assist in maintaining the personal communication device in a predetermined range of angles relative to the visor.

A lower edge of the personal communication device may, for example, be in close vicinity to or in contact with the forehead of the user when inserted through the laterally extending opening. An angle of a plane defined by the lens of the camera of the personal communication device may, for example, be maintained in a predetermined range of angles.

In general, an angle of a plane defined by the lens of the camera may be maintained in a predetermined range of angles. The range of angles may, for example, correspond to an angle of gaze of the user.

In a further aspect, a method of providing point-of-view video includes providing an article of headgear to be worn on the head of a user which includes a first portion to encompass at least a portion of the head of the user and a visor extending forward from the first portion, the visor including a laterally extending opening, and inserting a personal communication device including a camera through the laterally extending opening such that a lens of the camera is positioned below the lower surface of the visor.

The method may further include aligning a plane defined by a lens of the camera of the personal communication device to an angle with respect to the visor within a predetermined range of angles. The method may, for example, further include supporting a lower end of the personal communication device via a support system attached to the visor to support the personal communication device. In a number of embodiments, the personal communication device extends through the laterally extending opening so that a lower end of the personal communication device is in close vicinity to or contacts the forehead of the user. Software stored in a memory system of the personal communication device is executed by a processor system thereof (which is in operative connection with the camera) to communicate video (and typically audio) to a remote device/person.

Communication via the personal communication device may be bidirectional. Furthermore, more than two parties may, for example, participate in the communication (for example, via videoconferencing software as known in the computer arts).

In still a further aspect, a kit includes a retainer system adapted to form a connection with a laterally extending opening formed in a visor of an article of headgear as described above. In a number of embodiments, the kit further includes a template to assist a user in forming the laterally extending opening in the visor.

The present devices, systems, and methods, along with the attributes and attendant advantages thereof, will best be appreciated and understood in view of the following detailed description taken in conjunction with the accompanying drawings.

DETAILED DESCRIPTION

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "an abutment member" includes a plurality of such abutment members and equivalents thereof known to those skilled in the art, and so forth, and reference to "the abutment member" is a reference to one or more such abutment members and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

The terms "electronic circuitry", "circuitry" or "circuit," as used herein includes, but is not limited to, hardware, firmware, software or combinations of each to perform a function(s) or an action(s). For example, based on a desired feature or need. a circuit may include a software-controlled microprocessor, discrete logic such as an application specific integrated circuit (ASIC), or other programmed logic device. A circuit may also be fully embodied as software. As used herein, "circuit" is considered synonymous with "logic." The term "logic", as used herein includes, but is not limited to, hardware, firmware, software or combinations of each to perform a function(s) or an action(s), or to cause a function or action from another component. For example, based on a desired application or need, logic may include a software-controlled microprocessor, discrete logic such as an application specific integrated circuit (ASIC), or other programmed logic device. Logic may also be fully embodied as software.

The term "processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

The term "controller," as used herein includes, but is not limited to, any circuit or device that coordinates and controls the operation of one or more input and/or output devices. A controller may, for example, include a device having one or more processors, microprocessors, or central processing units capable of being programmed to perform functions.

The term "logic," as used herein includes, but is not limited to. hardware, firmware, software or combinations thereof to perform a function(s) or an action(s), or to cause a function or action from another element or component. Based on a certain application or need, logic may, for example, include a software controlled microprocess, discrete logic such as an application specific integrated circuit (ASIC), or other programmed logic device. Logic may also be fully embodied as software. As used herein, the term "logic" is considered synonymous with the term "circuit."

The term "software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

As described above, it is often beneficial to have real time video of the point of view (POV) of an onsite person transmitted to a remote person who may provide assistance in, for example, performing a task. Personal communication devices such as smartphones (for example, IPHONE®, ANDROID®, etc.) include high quality video cameras and a number of apps which enable video/audio communication. As, for example, illustrated schematically in FIG. 1, personal communication devices such as smartphones include electronic circuitry including a memory system in operative connection with a processor system (including, for example, a microprocessor). The memory system and processor system are in operative connection with the camera. Logic or software is stored on the memory system that is executable by the processor system to operate the personal communication device to transmit and receive video and audio transmission via a communication system in operative connection with the processor system, memory system and camera. The communication system may, for example, include one or more transceivers suitable to transmit/receive signals via a cellular phone communication system, radio waves (for example, BLUETOOTH), Wi-Fi, etc. in a wired or wireless manner, as known in the art. Commonly available applications such as APPLE® FACETIME®, GOOGLE® DUO™ and/or other video conferencing/communication/chatting (video chat) programs available for various operating systems and devices may be used in the devices, systems and method hereof.

Although personal communication devices include such video conferencing/communication/chatting programs or apps, it is very difficult for the onsite person to hold a personal communication device (for example, smartphone) camera in such a way as to provide an adequate view to a remote person or persons while simultaneously trying to complete a task using his or her hands.

Personal communication devices for use herein may, for example, be a small tablet computer or a smartphone. As used herein, the term "personal communication devices" refers generally to mobile devices which include a communication system, a processor system, one or more user interfaces (for example, a visual feedback system including a touchscreen or other display, an auditory feedback system, and a tactile feedback system etc.) and an operating system capable of running general-purpose applications. Examples of personal communication devices include, but are not limited to, smartphones, tablet computers and custom devices. As used herein, the term "tablet computer" or tablet, refers to a mobile computer with a communication system, a processor system, at least one user interface as described above, and an operating system capable of running general-purpose and specially developed custom applications in a single unit. As used herein, the term "smartphone" refers to a cellular telephone including a processor system, at least one user interface as described above (typically including a touchscreen display), and an operating system capable of running general-purpose and specially developed custom applications. Such personal communication devices are typically powered by rechargeable batteries and are housed as a single, mobile unit. A number of representative embodiments of systems and/or methods hereof may, for example, include a smartphone with customized user interface software to form at least a portion of the control system. Personal communication devices for use herein may, for example, include one or more applications or apps that provide for two-way audio/video communication such that video (and preferably audio) can be transmitted from an onsite person to a remote person and at least audio can be transmitted from the remote person to the onsite person in real time. Communications between two or more personal communication devices may, for example, be achieved via internet connectivity, cellular connectivity, radio wave connectivity, etc. and/or combinations thereof.

Figure 1:
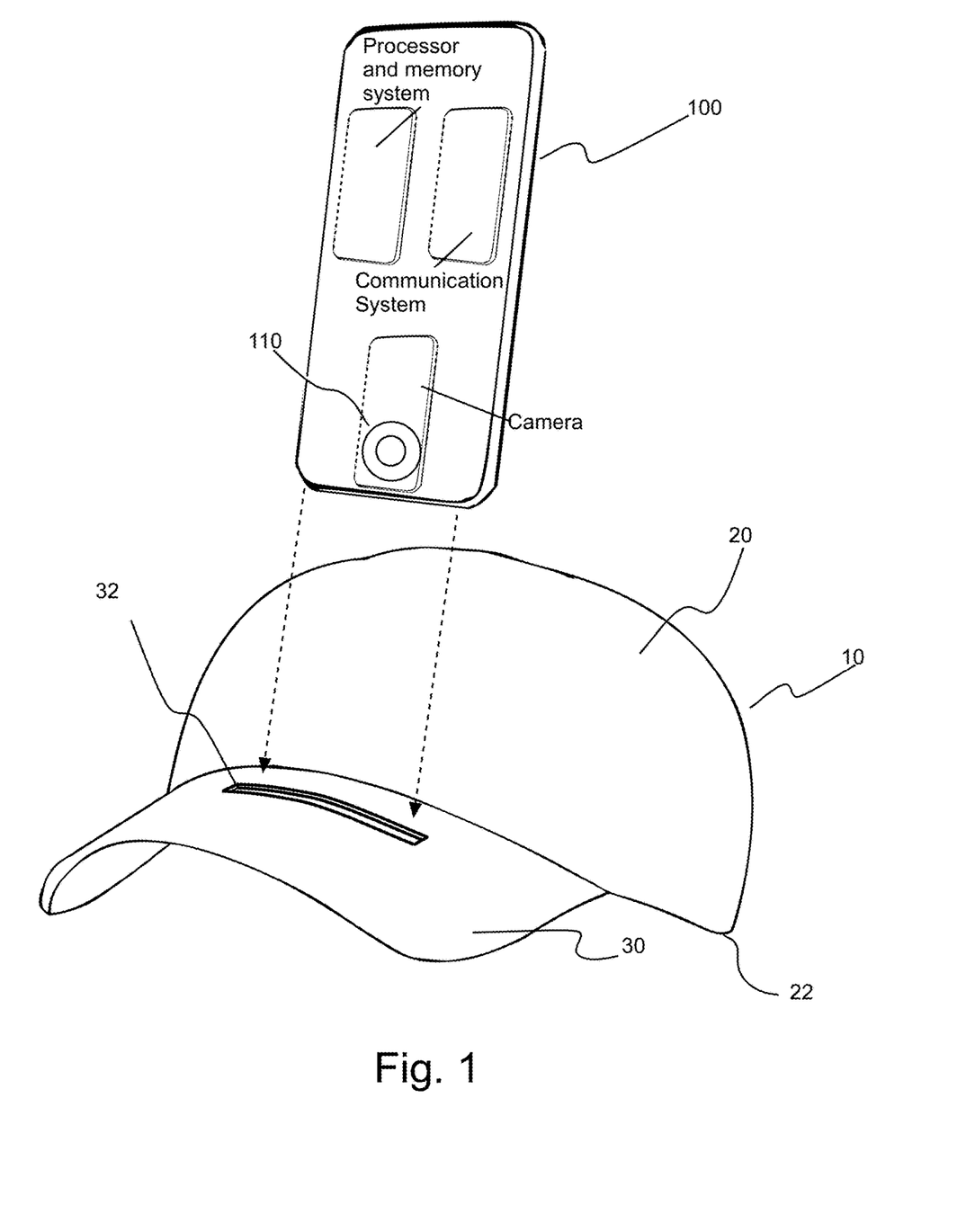
FIG. 1 illustrates a perspective view of an embodiment of an article of headgear (a cap) hereof including an opening or receptacle in the visor thereof for insertion of a smartphone.
Figure 2:
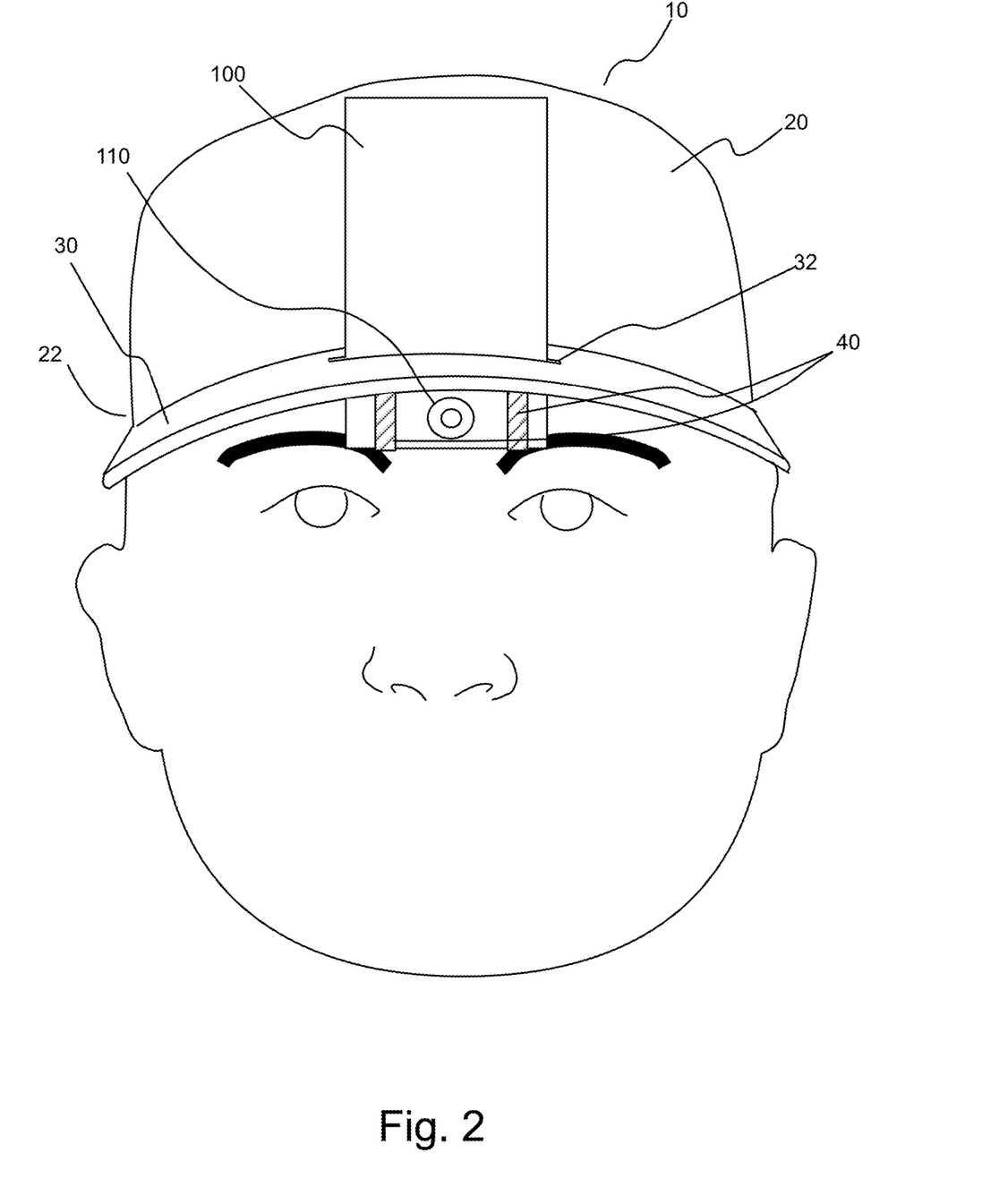
FIG. 2 illustrates a front view of the article of headgear of FIG. 1 as worn by a user, wherein a smartphone extends through the opening in the visor so that a lens of a camera of the smartphone faces forward.
Figure 3:
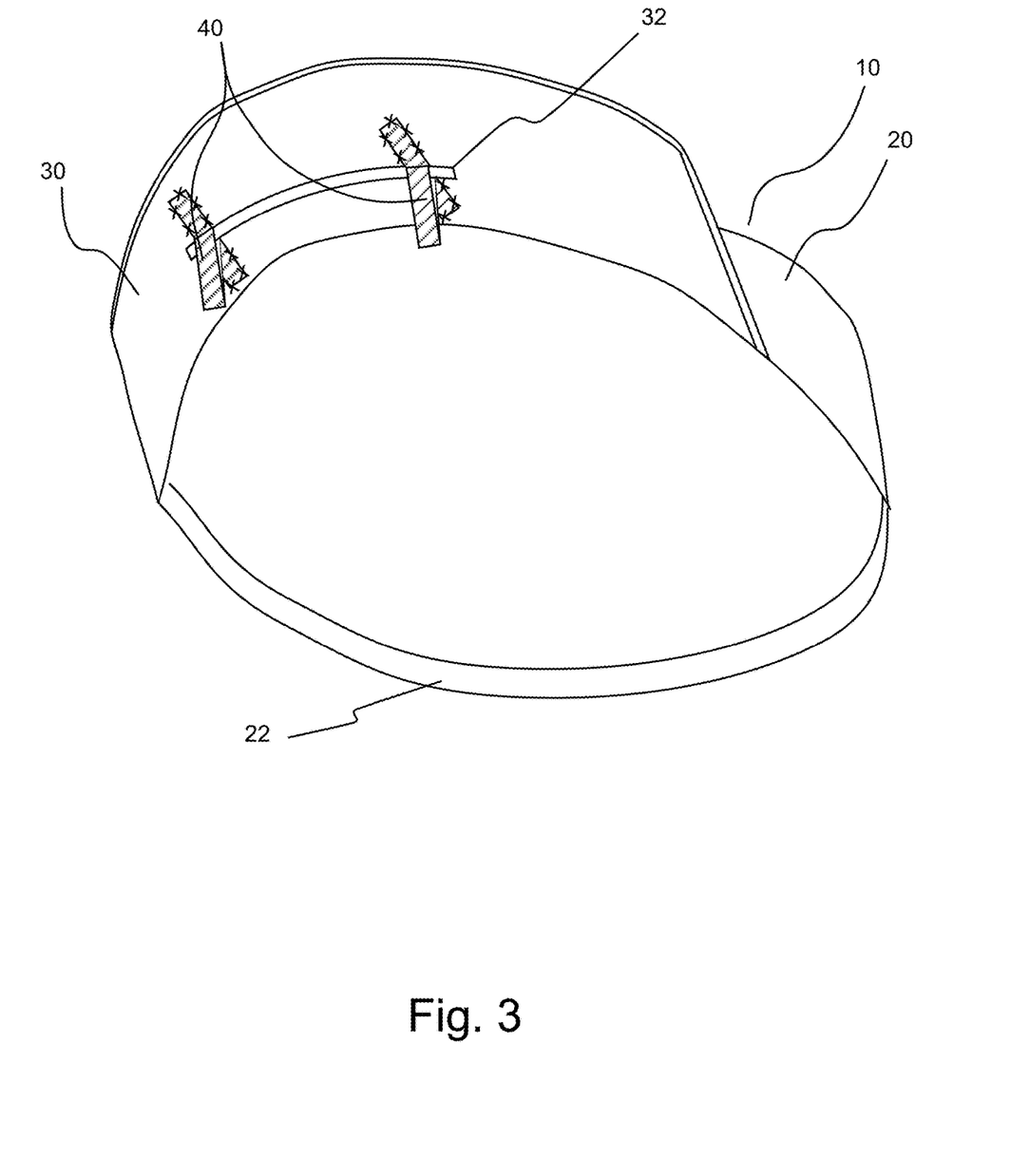
FIG. 3 illustrates a bottom perspective view of the article of headgear of FIG. 1.

In a number of embodiments, devices, systems and methods hereof include an article of headgear (for example, a hat, cap, helmet etc.) to be worn on the head of a user which includes a forward brim section or visor. In the embodiment of FIGS. 1 through 3, the article of headgear is a hat in the form of a ball cap 10. As known in the headgear arts, ball cap 10 includes a dome section 20 which includes a lower or band section 22 which encompasses and generally conforms to at least a portion of the head of the user. Ball cap 10 also includes a forward extending brim or visor 30. In the illustrated embodiment, a slot or opening 32 is formed in visor 30 which extends laterally in a manner that it is generally parallel to a line running through the eyes of the user (or generally parallel to the frontal plane of the user) when ball cap 30 is aligned properly on the user's head. Opening 32 is dimensioned to, for example, receive a personal communication device in the form of a smartphone 100 including a camera (shown schematically in FIG. 1, and which is in operative communication with the smartphone processor/memory system and communication system) having a camera lens 110. FIG. 1 illustrates smartphone 100 positioned to be received within opening 32.

Figure 9:
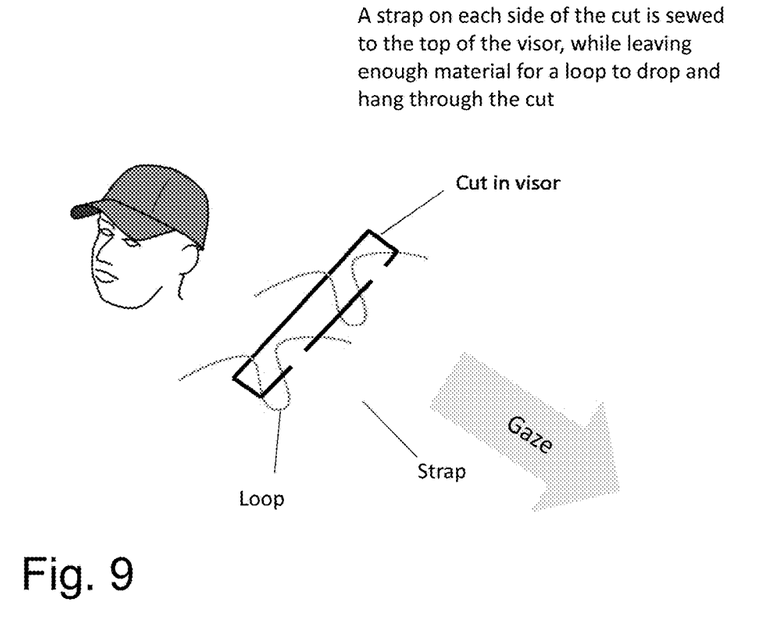
FIG. 9 illustrates schematically how a retainer system including looped straps may be used in connection with the opening in the visor of the article of headgear to retain the personal communication device.
Figure 10:
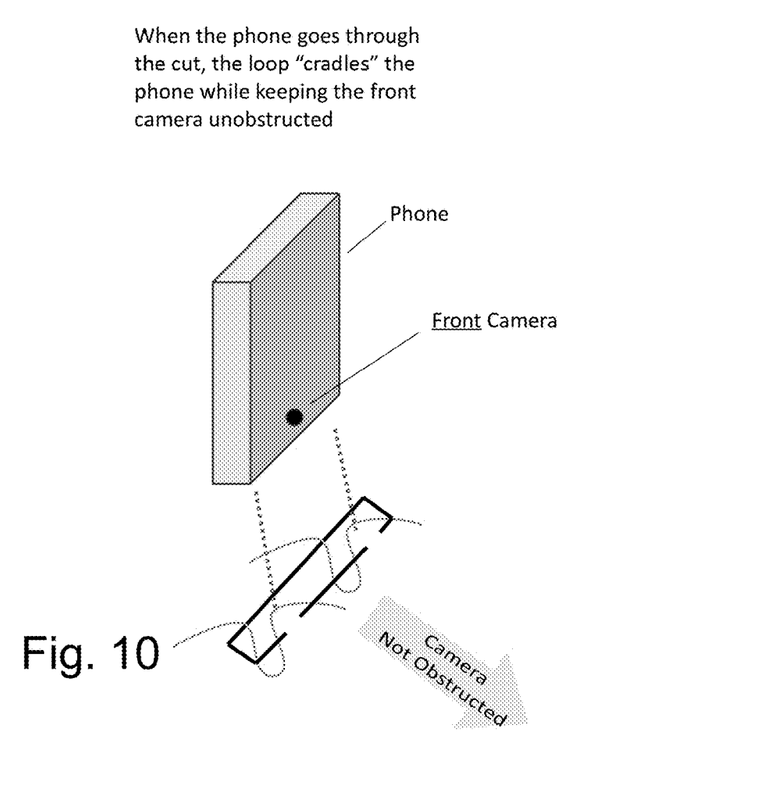
FIG. 10 illustrates schematically how spaced looped straps may be used in connection with the opening in the visor of the article of headgear to retain the personal communication device without obstructing the camera.
Figure 11:
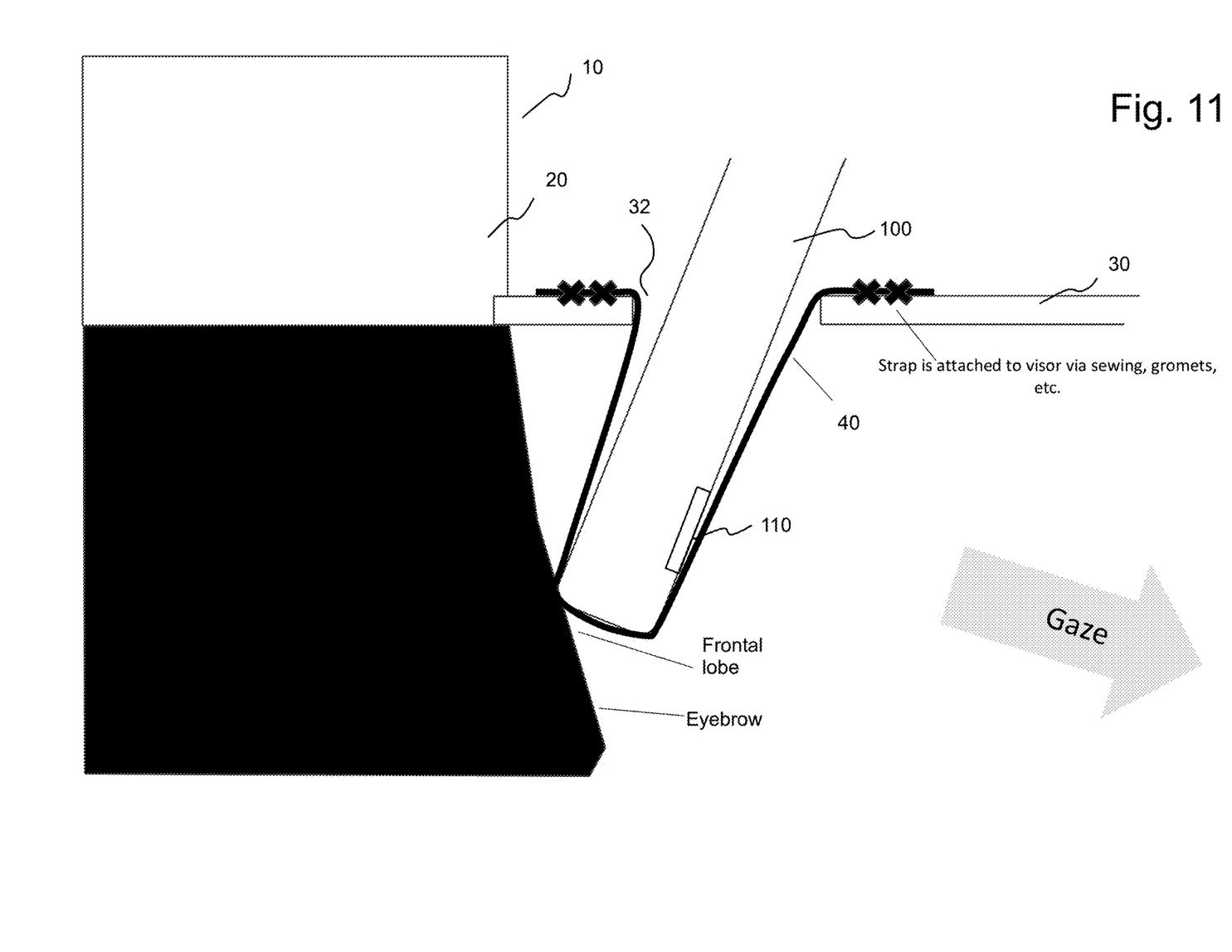
FIG. 11 illustrates a schematic side view of the use of an embodiment of a looped strap to retain a personal communication device such as a smartphone in operative connection with the article of headgear.

FIG. 2 illustrates a front view of the ball cap 10 worn on the head of a user wherein smartphone 100 is received in and extends through opening 32 in visor 30 so that lens 110 of the smartphone camera faces forward (with respect to the orientation of the user). In the illustrated embodiment, a lower retainer or support system includes two looped straps 40 which are attached to the underside of visor 30 (see, for example, FIGS. 3, 9 and 10) to retain and/or support smartphone 100 when it is extended through opening 32. Looped straps 40 are spaced to prevent obstruction of the view of camera lens 110. As illustrated in FIGS. 3 and 11, respectively, looped straps 40 may be attached to the underside or the top of visor 30 via stitching. Such straps or support members may be flexible or rigid.

Figure 4:
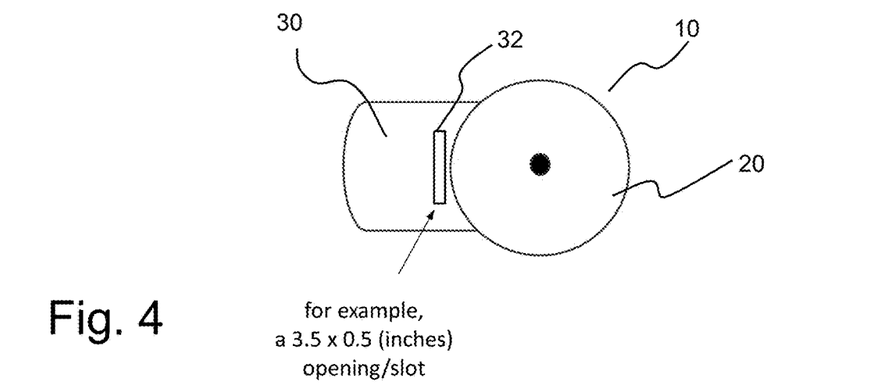
FIG. 4 illustrates schematically a top view of an embodiment of the article of headgear hereof in the form of a baseball cap.
Figure 5:
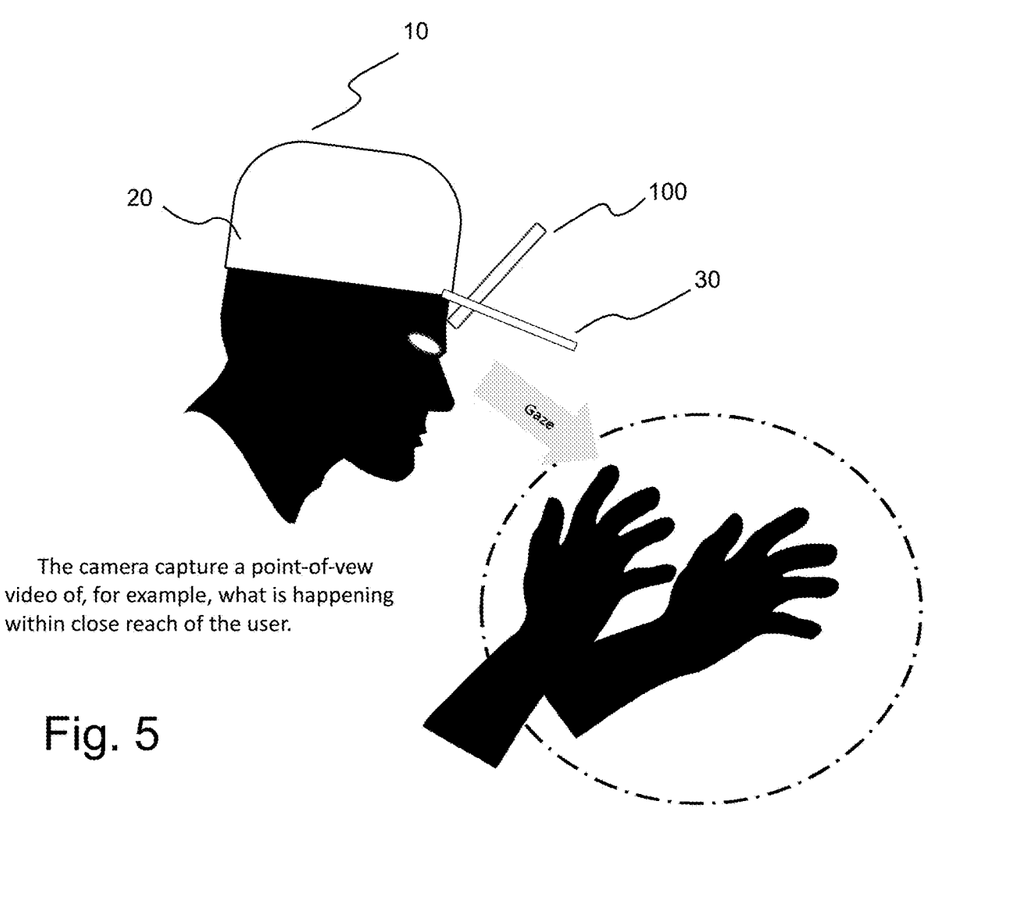
FIG. 5 illustrates schematically the article of headgear of FIG. 4 showing how the camera lens of a smartphone is oriented to focus in the general direction of the gaze of the user to capture a point-of-view video of, for example, what is occurring within the reach of the user.
Figure 6:
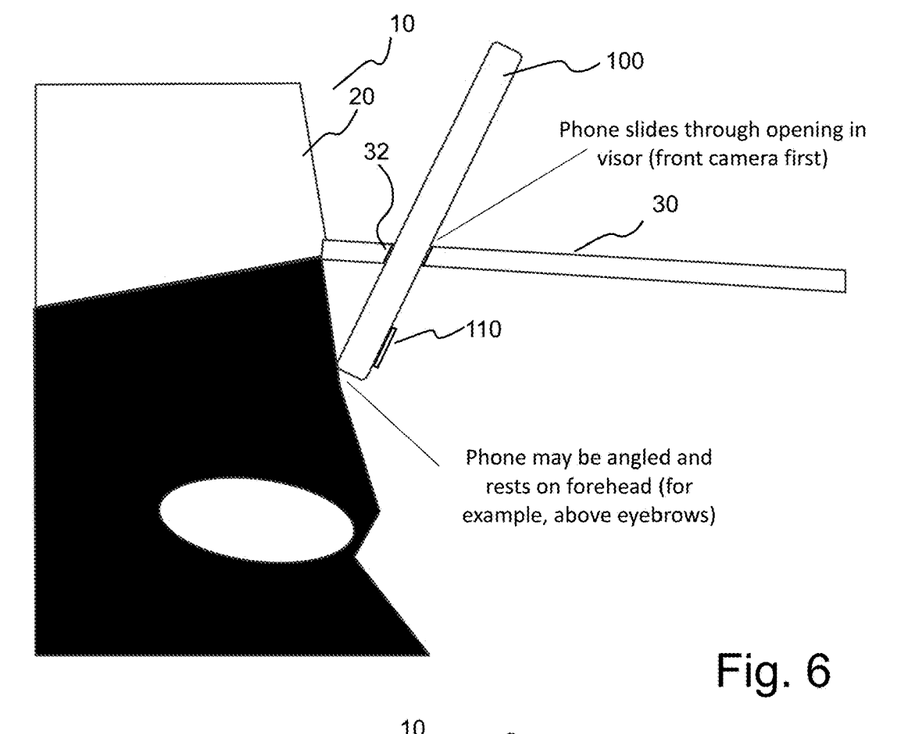
FIG. 6 illustrates schematically a partially cutaway side view of the smartphone received through the opening in the visor and angled to be placed in close vicinity with or to contact the forehead of the user above the eyebrows
Figure 7:
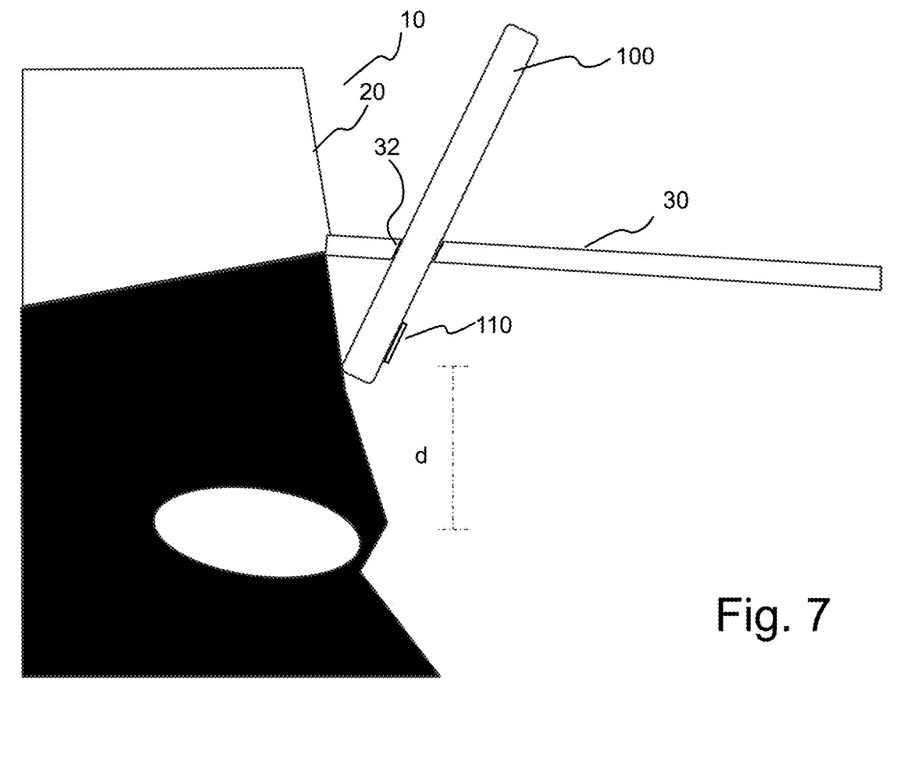
FIG. 7 illustrates schematically another partially cutaway side view of the smartphone received through the opening in the visor and illustrating that a distance d between the eye line and the camera may be minimized to provide the best possible point-of-view perspective.
Figure 8:
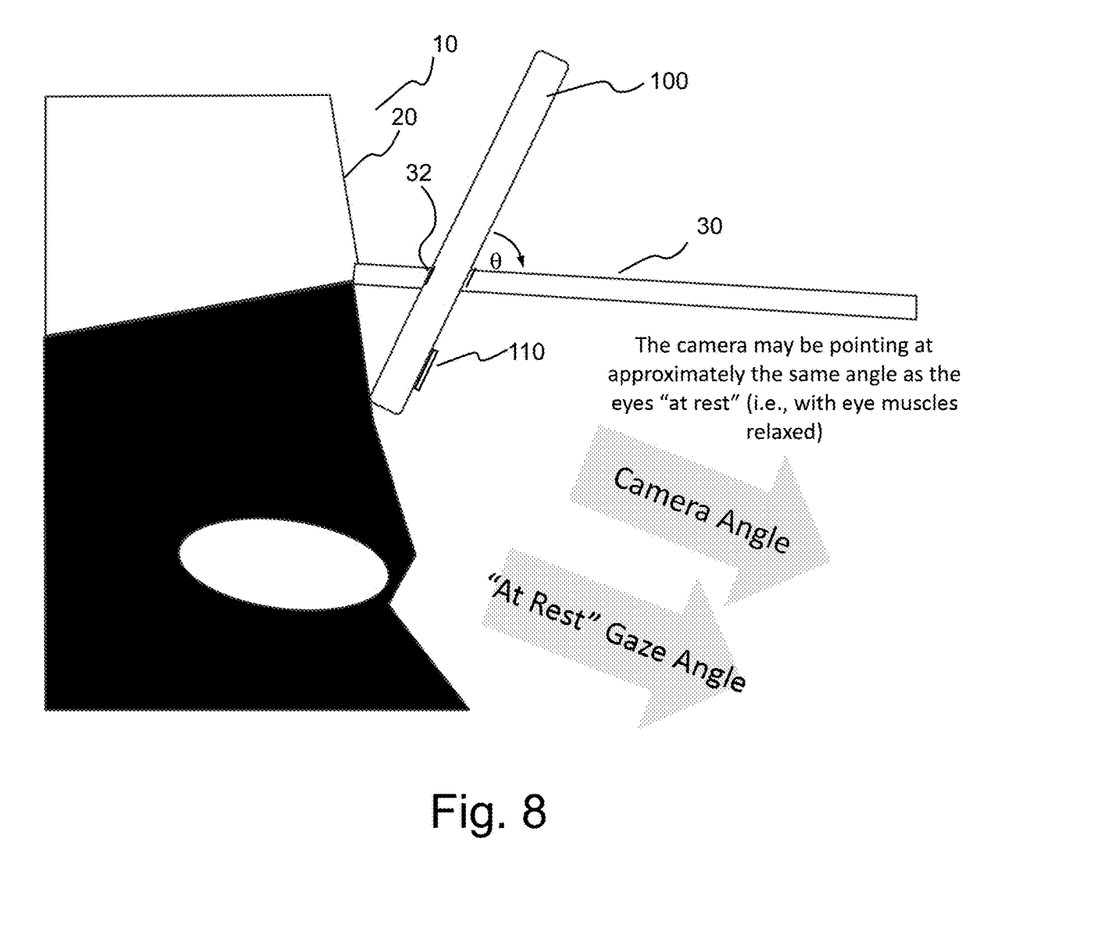
FIG. 8 illustrates schematically another partially cutaway side view of the smartphone received through the opening in the visor and illustrating that the camera lens may be oriented in generally the same direction of the gaze angle of the eyes at rest.

As illustrated in FIG. 4, opening 32 in a number of embodiments was approximately 3.5 inches in length and approximately 0.365 to 0.5 inches in width to cooperated with most available smartphones. As illustrated in, for example, FIG. 5, camera lens 110 of smartphone 100 is positioned below the lower surface of visor 30 and may be oriented to align with focus the general direction of the gaze of the user to capture a point-of-view video of, for example, what is occurring within the reach of the user. As illustrated in FIGS. 6 and 7, in a number of embodiments, the lower edge of smartphone 100 may be placed in close vicinity to be placed in contact with the user's forehead (for example, to rest against the forehead of the user) in the vicinity of (for example, slightly above) the glabella or the supraciliary arch. A distance d (see FIG. 7) between a lower edge of camera lens 110 and the centerline of the eyes (that is, a line passing through the center of each eye) may, for example, be minimized to facilitate point-of-view or POV alignment with the user's gaze. In a number of embodiments, the lower edge of camera lens 110 is not more than 1.5 in. from the centerline of the eyes, not more than 1.0 in. from the centerline of the eyes or not more than 0.6 in. from the centerline of the eyes.

In a number of embodiments, smartphone 100 is retained in operative connection with visor 30 at an angle θ so that the plane of camera lens 110 is angled in general alignment with (for example, within 20, degrees or less, 10 degrees or less, or 5 degrees or less) when the user's eyes are relaxed. In general, in a number of embodiments, it is desirable to align the camera lens angle with the user's gaze angle as the user is, for example, viewing the user's hands in performing a task. Smartphone 100 may, for example, be maintained within a predetermined range of angle θ with respect to visor 30 to provide a suitable POV transmission.

Figure 12:
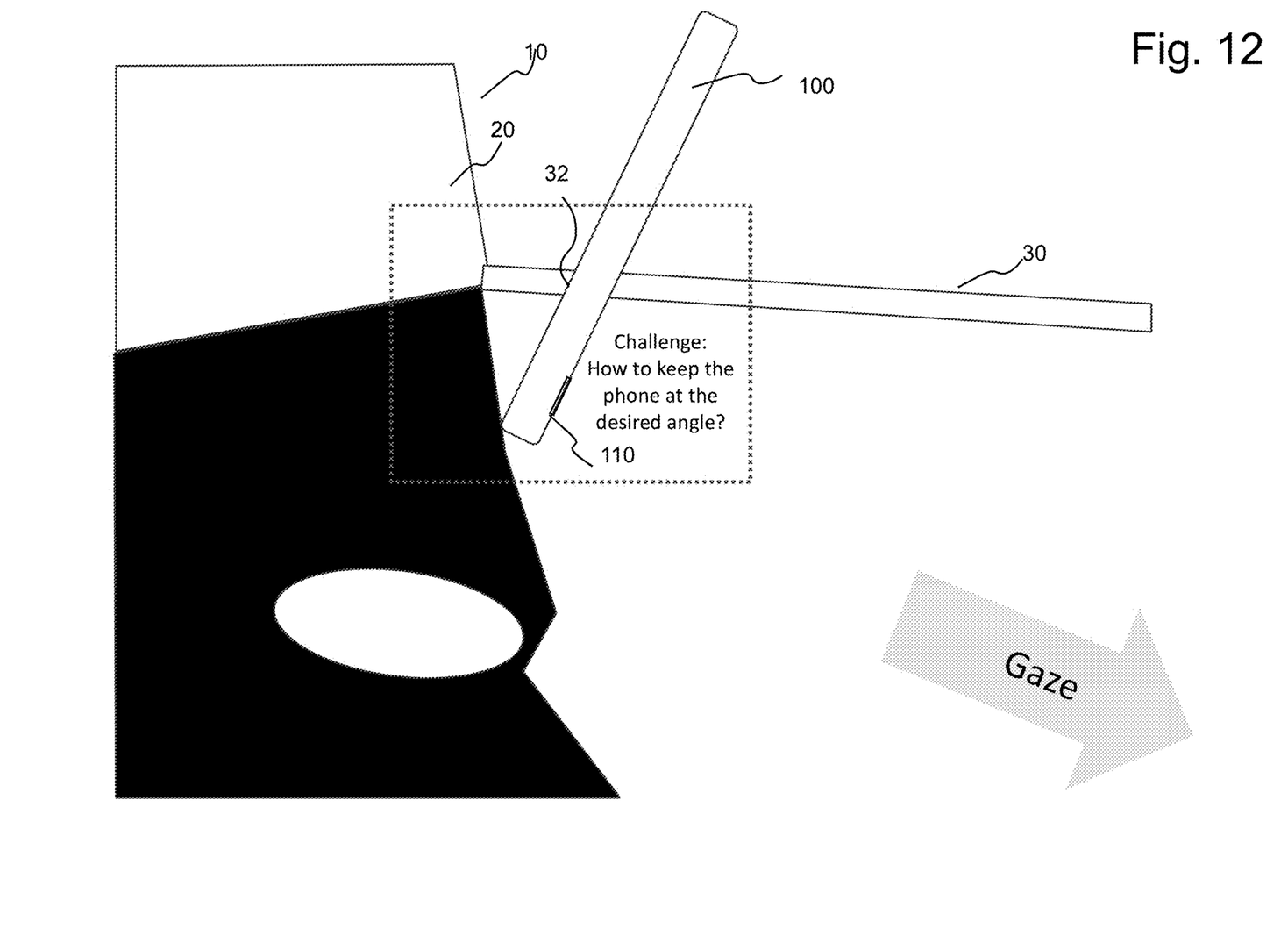
FIG. 12 illustrates schematically a partially cutaway side view of a camera received through the opening in the visor showing a potential difficulty in properly aligning the camera lens of the personal communication device.
Figure 13:
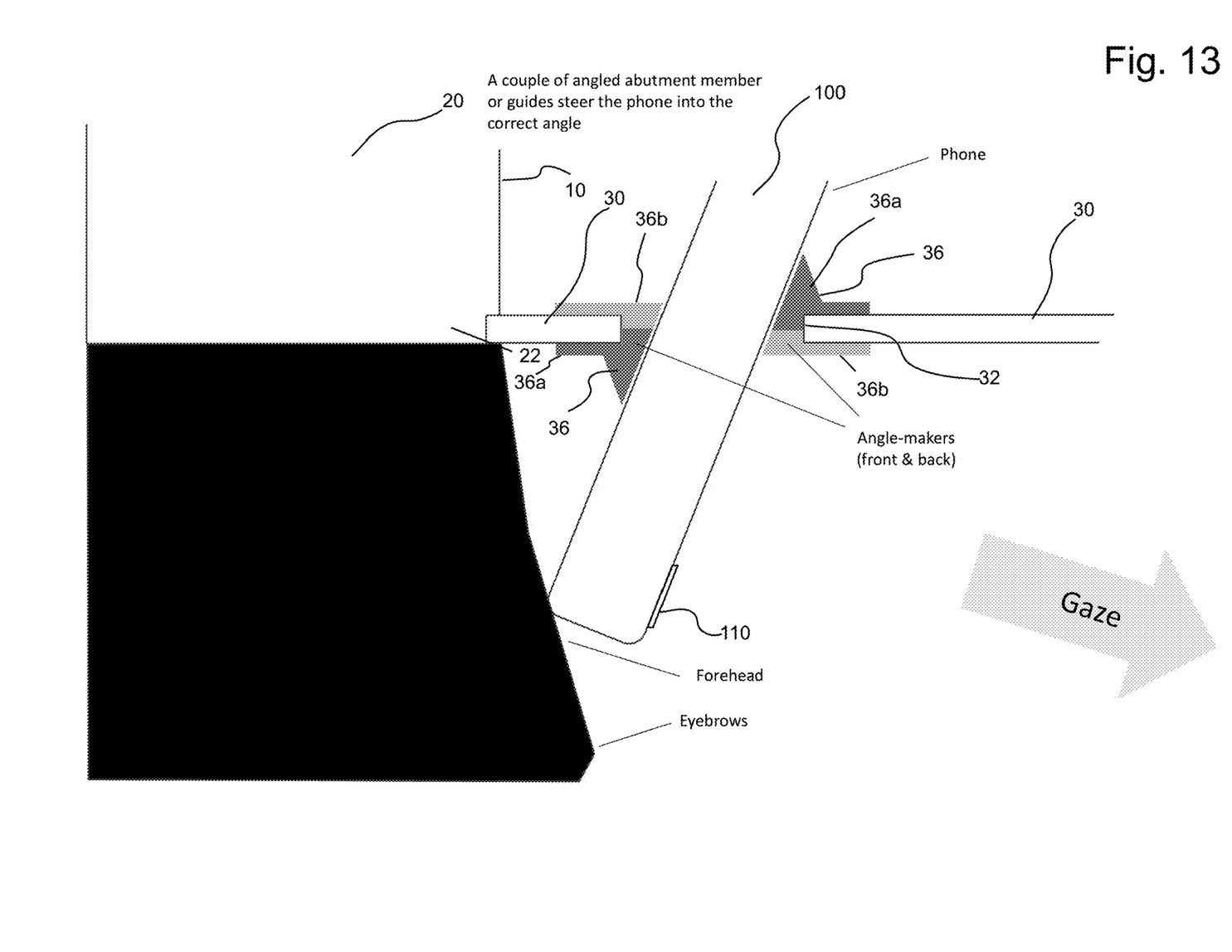
FIG. 13 illustrates schematically a partially cutaway side view of a smartphone received through the opening in the visor of another embodiment of an article of headgear including angled abutment members on the forward and rearward edges of the opening to assist in properly angling the personal communication device so that the camera lens is approximately or generally aligned with the user's gaze.
Figure 14:
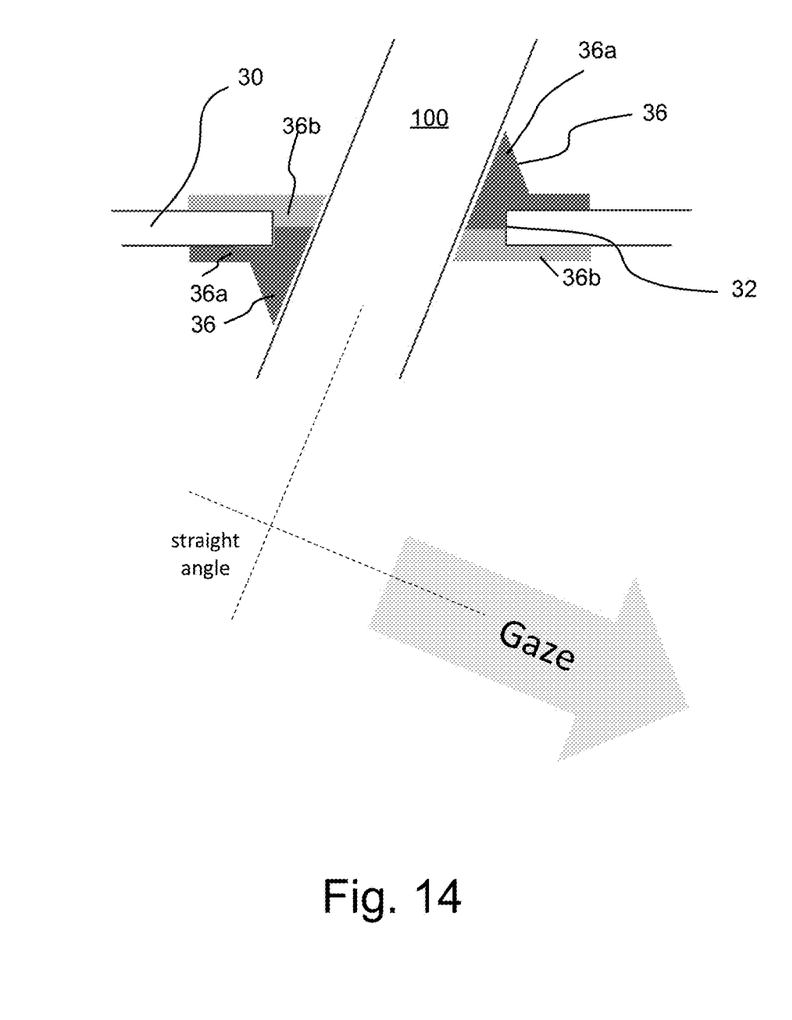
FIG. 14 illustrates an enlarged cutaway side view of the abutment members of FIG. 13.
Figure 15:
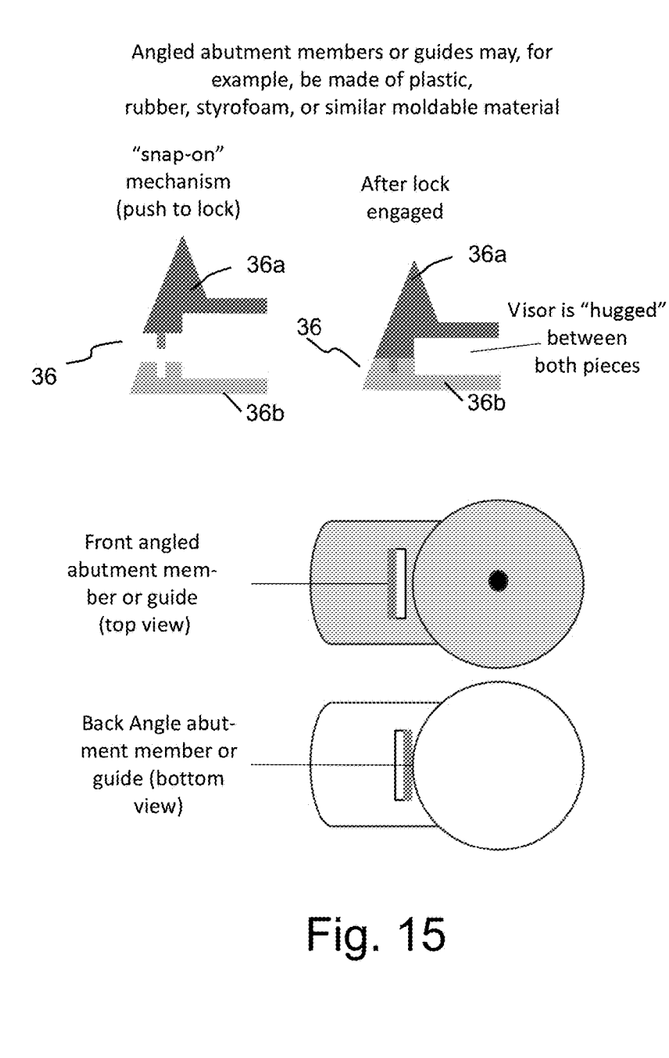
FIG. 15 illustrates another view of an embodiment of the abutment members illustrated in FIG. 13.

As illustrated in FIG. 12, it may be challenging in certain circumstances to maintain smartphone 100 and camera lens 110 in general alignment with the angle of gaze of the user. To assist in maintaining smartphone 100/camera lens 110 at a desirable angle θ with respect to visor 30, angled abutment members or guides 36 may be positioned on a front edge and a rearward edge of opening 32 to maintain a camera lens 110 within a desirable range of angles (see FIGS. 13 through 15). As illustrated in FIG. 14, a plane defined by camera lens 110 may be maintained at an angle that is generally perpendicular to the at-rest gaze angle. Angled abutment members 36 may, for example, be formed from a polymeric (or other) material such as a plastic, a rubber, a Styrofoam, a polyurethane foam or a similar material. As illustrated in FIG. 13 through 15, angled abutment member 36 may be formed in two attachable parts 36a and 36b to encompass the edges of opening 32 in visor 30.

Figures 16A, 16B, 16C, 16D, 16E:
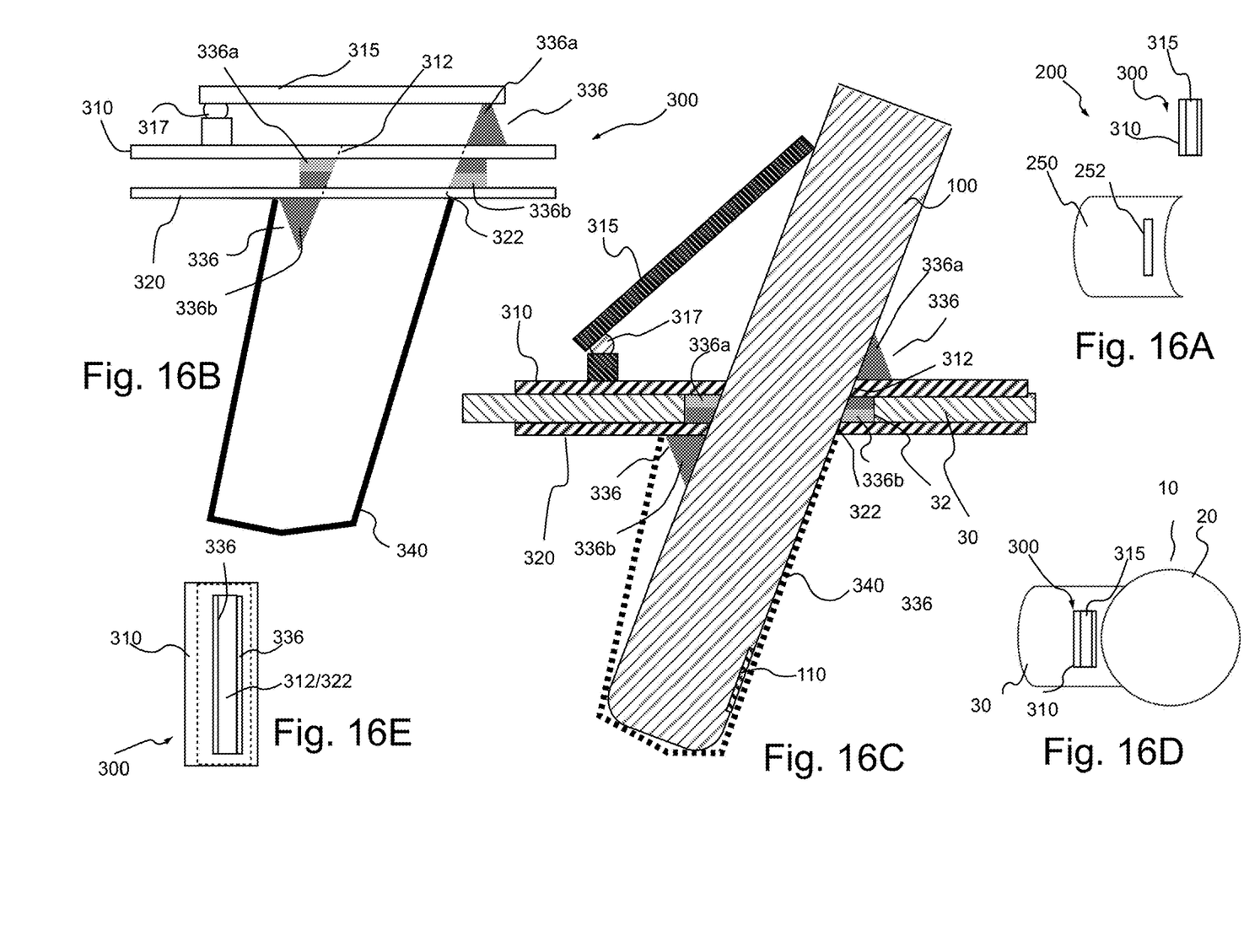
FIG. 16A illustrates a top view of an embodiment of a kit hereof.
FIG. 16B illustrates a side view of a retainer system of the kit of FIG. 16A.
FIG. 16C illustrates a cross-sectional view of the retainer system of FIG. 16B in operative connection with a visor of an article of headgear with a smartphone in operative connection with the retainer system.
FIG. 16D illustrates a top view of the retainer system of FIG. 16B in operative connection with an article of headgear.
FIG. 16E illustrates a top view of the retainer system of FIG. 16B wherein a cover section of the retainer system is illustrated in broken lines and as transparent.

FIGS. 16A through 16D illustrate a kit 200 hereof that may be used to retrofit certain headgear such as ball cap 10 to interact with a smartphone or other personal communication device as described herein. As illustrated in FIG. 16A, kit 200 includes a template 250 including a slot 252 formed therein to assist in forming opening 32 in visor 30 at a predetermined position as described above. Kit 200 also includes retainer system 300 which cooperates with opening 32 to retain smartphone 100 or a similar personal communication device in connection with ball cap 10 as described above. As illustrated in FIG. 16C through 16E, retainer system 300 may include an upper flange 310 and lower flange 320 that form angled abutment member 336 (similar to angled abutment members 36 described above). In that regard, upper flange 310 may have attached thereto (or formed integrally therewith) upper angled abutment sections 336a. Upper angled abutment sections 336a cooperate with and attach to lower angled abutment sections 336b attached to (or formed integrally) with lower flange 320 to encompass the edges of opening 32 in visor 30 and maintain retainer system 300 in operative connection with visor 30. Upper flange 310 and lower flange 320 may, for example, be formed from a flexible material (for example, a polymeric material) to better conform to the shape of visor 30.

In a number of embodiments, retainer system 300 may include a cover 315 connected to upper flange 310 to cover openings 312 and 322 in upper flange 310 and lower flange 320, respectively (through which phone 100 passes) when not in used. Cover 315 may, for example, be connected to upper flange 310 via a biased connection (for example, a spring biased hinge) such that it is biased in a closed position. Such biasing may also help in forming a firm engagement with smartphone 100 as illustrated in FIG. 16C. One or more lower supports 340 (similar in operation to support 40 described above) may be attached to, for example, lower flange 320 to provide further support for smartphone 100.

Passing a personal communication devices such as smartphone 100 thorough, for example, opening 32 or 322 as disclosed herein (wherein a portion of smartphone 100 extends below visor 30 and a portion of smartphone 100 extends above visor 30) results in better alignment of the center of gravity of smartphone 100 with the plane/center of gravity of visor 30 and reduces the torque on headgear/cap 10 as compared to the case in which a smartphone or similar device is attached to a top surface or a bottom surface of visor 30 and extends upward or downward, respectively, therefrom. The weight of the smartphone or similar device is thus less likely to cause movement of the hat relative to the user's head (and resultant misalignment of the phone and/or discomfort). Moreover, by positioning the lower end of smartphone 100 near (or in the vicinity of) or in contact with the forehead of the user, the motion of the assembly of smartphone 100/hat 10 is limited and/or stabilized without creating significant discomfort for the user. Still further, the positioning of the camera lens 110 within a defined range of angles θ and within a defined range of distance d between the lower edge of camera lens 110 and the centerline of the eyes, which are defined by the positioning of opening 32 (for example, the distance between dome section 20 and opening 32), the nature of any guides such as guides 36, the nature of retainer or support system 40, etc. provides significantly greater ease in aligning (and maintaining the alignment of) the orientation of camera lens 110 to the angle of gaze of the user regardless of the orientation of the user's head and/or changes in that orientation by movement of the user's head. Also, the positioning of camera lens 110 in the devices, systems and method hereof minimizes or eliminates interference of visor portion 30 with the field of camera lens 110 (which is maintained in relatively close agreement with the field of the user's view).

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. An article of headgear to be worn on the head of a user, comprising: a first portion to encompass at least a portion of the head of the user, a visor extending forward from the first portion, the visor comprising a laterally extending opening therein to receive a personal communication device including a camera such that a lens of the camera is positioned below the lower surface of the visor, and a first angled abutment member attached to the visor in the vicinity of the laterally extending opening to assist in maintaining the personal communication device in a predetermined range of angles relative to the visor.

2. The article of headgear of claim 1 further comprising a support system attached to the visor to support the personal communication device.

3. The article of headgear of claim 2 wherein the support system comprises one or more of spaced looped straps to extend around a lower end of the personal communication device.

4. The article of headgear of claim 2 wherein a lower edge of the personal communication device contacts the forehead of the user when inserted through the laterally extending opening.

5. The article of headgear of claim 1 wherein the first angled abutment member is attached to the visor in the vicinity of a front edge of the laterally extending opening and the article of headgear further comprises a second angled abutment member attached to the visor in the vicinity of a rear edge of the laterally extending opening to assist in maintaining the personal communication device in a predetermined range of angles relative to the visor.

6. The article of headgear of claim 1 wherein a lower edge of the personal communication device contacts the forehead of the user when inserted through the laterally extending opening.

7. The article of headgear of claim 1 wherein an angle of a plane defined by the lens of the camera of the personal communication device is maintained in a predetermined range of angles.

8. A system, comprising:
an article of headgear to be worn on the head of a user comprising a first portion to encompass at least a portion of the head of the user and a visor extending forward from the first portion, the visor comprising a laterally extending opening,
a personal communication device including a camera, wherein the laterally extending opening is dimensioned to pass the personal communication device therethrough such that a lens of the camera is positioned below the lower surface of the visor, and
a first angled abutment member attached to the visor in the vicinity of the laterally extending opening to assist in maintaining the personal communication device in a predetermined range of angles relative to the visor.

9. The system of claim 8 further comprising a support system attached to the visor to support the personal communication device.

10. The system of claim 9 wherein the support system comprises one or more spaced looped straps to extend around a lower end of the personal communication device.

11. The system of claim 9 wherein a lower edge of the personal communication device contacts the forehead of the user when inserted through the laterally extending opening.

12. The system of claim 8 wherein the first angled abutment member is attached to the visor in the vicinity of a front edge of the laterally extending opening and the system further comprises a second angled abutment member attached to the visor in the vicinity of a rear edge of the laterally extending opening to assist in maintaining the personal communication device in a predetermined range of angles relative to the visor.

13. The system of claim 8 wherein a lower edge of the personal communication device contacts the forehead of the user when inserted through the laterally extending opening.

14. The system of claim 8 wherein an angle of a plane defined by the lens of the camera of the personal communication device is maintained in a predetermined range of angles.

15. A method of providing point-of-view video, comprising providing an article of headgear to be worn on the head of a user including a first portion to encompass at least a portion of the head of the user, a visor extending forward from the first portion and having a laterally extending opening, and a first angled abutment member attached to the visor in the vicinity of the laterally extending opening to assist in maintaining a personal communication device in a predetermined range of angles relative to the visor, and inserting the personal communication device including a camera through the laterally extending opening such that a lens of the camera is positioned below the lower surface of the visor.

16. The method of claim 15 further comprising aligning a plane defined by the lens of the camera of the personal communication device to an angle within the predetermined range of angles relative to the visor.

17. The method of claim 15 further comprising supporting a lower end of the personal communication device via a support system attached to the visor to support the personal communication device.

18. The method of claim 15 wherein the personal communication device extends through the laterally extending opening so that a lower end of the personal communication device contacts the forehead of the user.

\* \* \* \* \*